US010157069B2

(12) United States Patent
Rudrappa Goniwada

(10) Patent No.: US 10,157,069 B2
(45) Date of Patent: Dec. 18, 2018

(54) IDENTIFYING AND USING DEPENDENCIES IN HISTORICAL APPLICATIONS TO GENERATE APPLICATION DESIGNS

(71) Applicant: Accenture Global Solutions Limited, Dublin (IE)

(72) Inventor: Shivakumar Rudrappa Goniwada, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/495,110

(22) Filed: Apr. 24, 2017

(65) Prior Publication Data

US 2018/0307506 A1 Oct. 25, 2018

(51) Int. Cl.

| | |
|---|---|
| ***G06F 9/44*** | (2018.01) |
| ***G06F 9/445*** | (2018.01) |
| ***G06F 8/20*** | (2018.01) |
| ***G06F 17/50*** | (2006.01) |
| ***G06F 8/38*** | (2018.01) |
| ***G06F 8/65*** | (2018.01) |
| *G06F 8/30* | (2018.01) |
| *G06F 9/451* | (2018.01) |

(52) U.S. Cl.

CPC ............ *G06F 9/44526* (2013.01); *G06F 8/24* (2013.01); *G06F 8/38* (2013.01); *G06F 8/66* (2013.01); *G06F 17/50* (2013.01); *G06F 8/315* (2013.01); *G06F 9/451* (2018.02)

(58) Field of Classification Search

CPC ... G06F 8/24; G06F 8/315; G06F 8/38; G06F 8/66; G06F 9/4443; G06F 9/44526; G06F 9/451; G06F 17/50

USPC .................................. 717/104–123, 141–144

See application file for complete search history.

(56) References Cited

U.S. PATENT DOCUMENTS

| | | | | |
|---|---|---|---|---|
| 7,865,881 | B2 * | 1/2011 | Wilkinson | G06F 8/433 717/124 |
| 9,552,276 | B1 * | 1/2017 | Hale | G06F 8/433 |
| 9,652,214 | B1 * | 5/2017 | Eberlein | G06F 8/61 |
| 9,740,462 | B2 * | 8/2017 | Rao | G06F 8/33 |
| 2014/0380271 | A1 | 12/2014 | Somani et al. | |

OTHER PUBLICATIONS

Vijayakumar et al., "DSL Approach for Development of Gaming Applications", Springer India, pp. 199-211.*

(Continued)

*Primary Examiner* — Ted T. Vo

(74) *Attorney, Agent, or Firm* — Harrity & Harrity, LLP

(57) ABSTRACT

A device to execute an application design plugin associated with a user interface. The device may analyze, using the application design plugin, a set of historical applications to identify one or more dependencies included in the set of historical applications. The device may provide, to a storage device, historical application metadata relating to the one or more dependencies. The device may receive, via the user interface, a request to generate an application design. The device may update the user interface with design information that includes design feature metadata identifying the one or more dependencies. The device may determine that the application design is ready for validation. The device may validate the application design based on determining that the application design is ready for validation.

20 Claims, 9 Drawing Sheets

100
App Explorer
New application
Modify existing application
App Design Folder
App Flow
App Flow Diagram
App.flow_diagram
Palette
Objects
Connections
Outline
Task
Historical Application
Properties
Name
120
Receive request to generate new application
125
Obtain historical application metadata
User Device
External Storage Device

(56) References Cited

OTHER PUBLICATIONS

Soroker et al., "Pegboard: A Framework for Developing Mobile Applications", 2006, ACM, pp. 138-150.*

Berger et al., "Utilizing domain models for application design and validation", 2009, Elsevier, Information and Software Technology 51, pp. 1275-1289.*

* cited by examiner

| App Type | Sequence Index | Historical App Name | Next Index | Thread indicator | Time Stamp |
|---|---|---|---|---|---|
| App FLOW | 1 | Black01 | [2,3,4] | Null | 2013-08-05 15:21:10 |
| App FLOW | 2 | Cardappl | [7,8,9] | Null | 2013-08-05 15:21:10 |
| App FLOW | 3 | CT001 | [5,6] | Null | 2013-08-05 15:21:10 |
| App FLOW | 4 | Blue01 | [10,11] | Null | 2013-08-05 15:21:10 |
| App FLOW | 5 | PACRA001 | 12 | Null | 2013-08-05 15:21:10 |
| App FLOW | 6 | PACRA002 | 12 | Null | 2013-08-05 15:21:10 |
| App FLOW | 7 | PLAT01 | 12 | | 2013-08-05 15:21:10 |
| App FLOW | 8 | PLUM01 | 12 | | 2013-08-05 15:21:10 |
| App FLOW | 9 | Green01 | 12 | Null | 2013-08-05 15:21:10 |
| App FLOW | 10 | GOLD01 | 12 | Y | 2013-08-05 15:21:10 |
| App FLOW | 11 | GR0001 | 12 | Y | 2013-08-05 15:21:10 |
| App FLOW | 12 | Done | Null | Null | Null |

100

IDENTIFYING AND USING DEPENDENCIES IN HISTORICAL APPLICATIONS TO GENERATE APPLICATION DESIGNS

BACKGROUND

Integrated development environments (IDEs) may include a workspace that allows a software developer to design applications. Additionally, the IDE may support plugins for customizing the workspace.

SUMMARY

According to some possible implementations, a device may include one or more processors to execute an application design plugin associated with a user interface. The one or more processors may analyze, using the application design plugin, a set of historical applications to identify one or more dependencies included in the set of historical applications. The one or more dependencies may identify relationships between historical applications. The one or more processors may provide, to a storage device, historical application metadata relating to the one or more dependencies. The one or more processors may receive, via the user interface, a request to generate an application design. The one or more processors may update the user interface with design information that includes a set of design features for generating the application design. The set of design features may include design feature metadata identifying the one or more dependencies. The one or more processors may receive an indication that the application design is ready for validation. The one or more processors may validate the application design based on receiving the indication that the application design is ready for validation.

According to some possible implementations, a method may include executing, by a device, an application design plugin associated with a user interface. The method may include analyzing, by the device and using the application design plugin, a set of historical applications to identify one or more dependencies included in the set of historical applications. The one or more dependencies may identify relationships between historical applications. The method may include providing, by the device and to a storage device, historical application metadata relating to the one or more dependencies. The method may include receiving, by the device and via the user interface, a request to generate a new application design or to modify a historical application design. The method may include updating, by the device, the user interface with design information that includes a set of design features for generating the new application design or modifying the historical application design. The set of design features may include design feature metadata identifying the one or more dependencies. The method may include receiving, by the device, an indication that the new application design or the modified historical application design is ready for validation. The method may include validating, by the device, the new application design or the modified historical application design based on receiving the indication.

According to some possible implementations, a non-transitory computer-readable medium may store one or more instructions that, when executed by the one or more processors, cause the one or more processors to execute an application design plugin associated with a user interface. The one or more instructions may cause the one or more processors to analyze, using the application design plugin, a set of historical applications to identify one or more dependencies included in the set of historical applications. The one or more instructions may cause the one or more processors to provide, to a storage device, historical application metadata relating to the one or more dependencies. The one or more instructions may cause the one or more processors to receive, via the user interface, a request to generate an application design. The one or more instructions may cause the one or more processors to update the user interface with design information. The design information may include design feature metadata identifying the one or more dependencies. The one or more instructions may cause the one or more processors to determine that the application design is ready for validation. The one or more instructions may cause the one or more processors to validate the application design based on determining that the application design is ready for validation.

DETAILED DESCRIPTION

The following detailed description of example implementations refers to the accompanying drawings. The same reference numbers in different drawings may identify the same or similar elements.

An IDE may include a workspace that allows a software developer to create an application design. When creating an application design, a software developer may identify one or more objects that describe functions or features of the application. The software developer may use a user interface of the IDE to create dependencies (i.e., relationships) between the one or more objects. However, the software developer may spend time creating dependencies between objects that have already been created in historical applications. Additionally, the software developer may modify historical applications. For example, the software developer may modify a dependency of a first historical application that may require alterations to a second historical application in order to execute properly. This may be difficult if the software developer is unaware of the second historical application that needs to be altered.

Implementations described herein provide a user device to execute an IDE with an application design plugin to identify and utilize dependencies in historical applications to generate application designs. For example, the user device may identify one or more dependencies included in a set of historical applications, may update the IDE with design information that is associated with the set of historical applications, and may validate the application design using the one or more dependencies. In this way, the user device conserves processing resources that might otherwise be used to correct errors in dependencies that are caused by modifying applications. Additionally, the user device conserves business resources (e.g., by saving software developer time) by allowing the software developer to re-use objects and dependencies of historical applications, rather than having to re-create the objects and dependencies. Furthermore, by allowing the software developer to re-use the objects and dependencies of historical applications, the user device reduces utilization of computing resources.

Figure 1A:
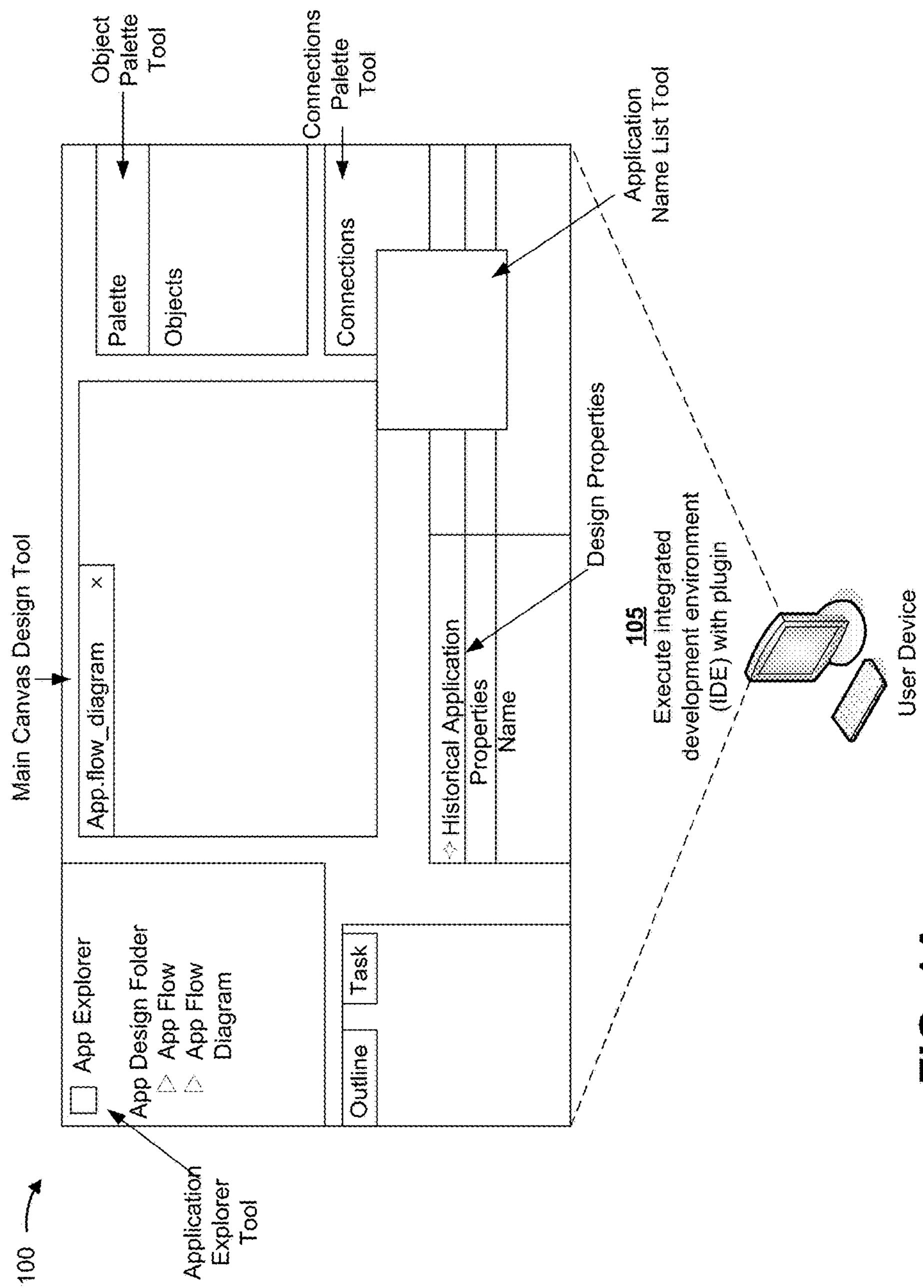
FIGS. 1A-1F are diagrams of an overview of an example implementation described herein.

FIGS. 1A-1F are diagrams of an overview of an example implementation 100 described herein. As shown in FIG. 1A, and by reference number 105, a user device may execute an integrated development environment (IDE) that includes an application design plugin. For example, the user device may execute an IDE that includes a set of design windows that are viewable via a user interface. As shown, the set of design windows may include a project explorer window, a main canvas design window, an objects palette window, a connections palette window, a design properties window, an application names list window, and/or the like.

As shown, the set of design windows may include an application explorer window that allows a user to create and/or modify an application design. The application explorer window may include a design folder to display active application designs. Additionally, or alternatively, the set of design windows may include a main canvas design window for displaying an application flow diagram that includes one or more objects and one or more object connections to identify relationships between the objects. Additionally, or alternatively, the set of design windows may include an objects palette window for displaying a list of one or more objects. In some cases, a user may select an object from the object palette window and may move the object into the main canvas design window.

Additionally, or alternatively, the set of design windows may include a connections palette for displaying a list of connections between objects. In some cases, a user may select a connection from the connections palette window and may move the object connection into the main canvas design window. Additionally, or alternatively, the set of design windows may include a design properties window for displaying one or more design properties relating to an application design, such as an application name, an application description, and/or the like. Additionally, or alternatively, the set of design windows may include an application names list window for displaying a list of application names. For example, the application names list window may display all (or some) application names for applications included in a set of historical applications, as described further herein. In some implementations, the applications names list window may display application names for applications that share at least one dependency.

In this way, the set of design windows may allow a user (e.g., a software developer) to generate an application design, as described further herein.

Figure 1B:
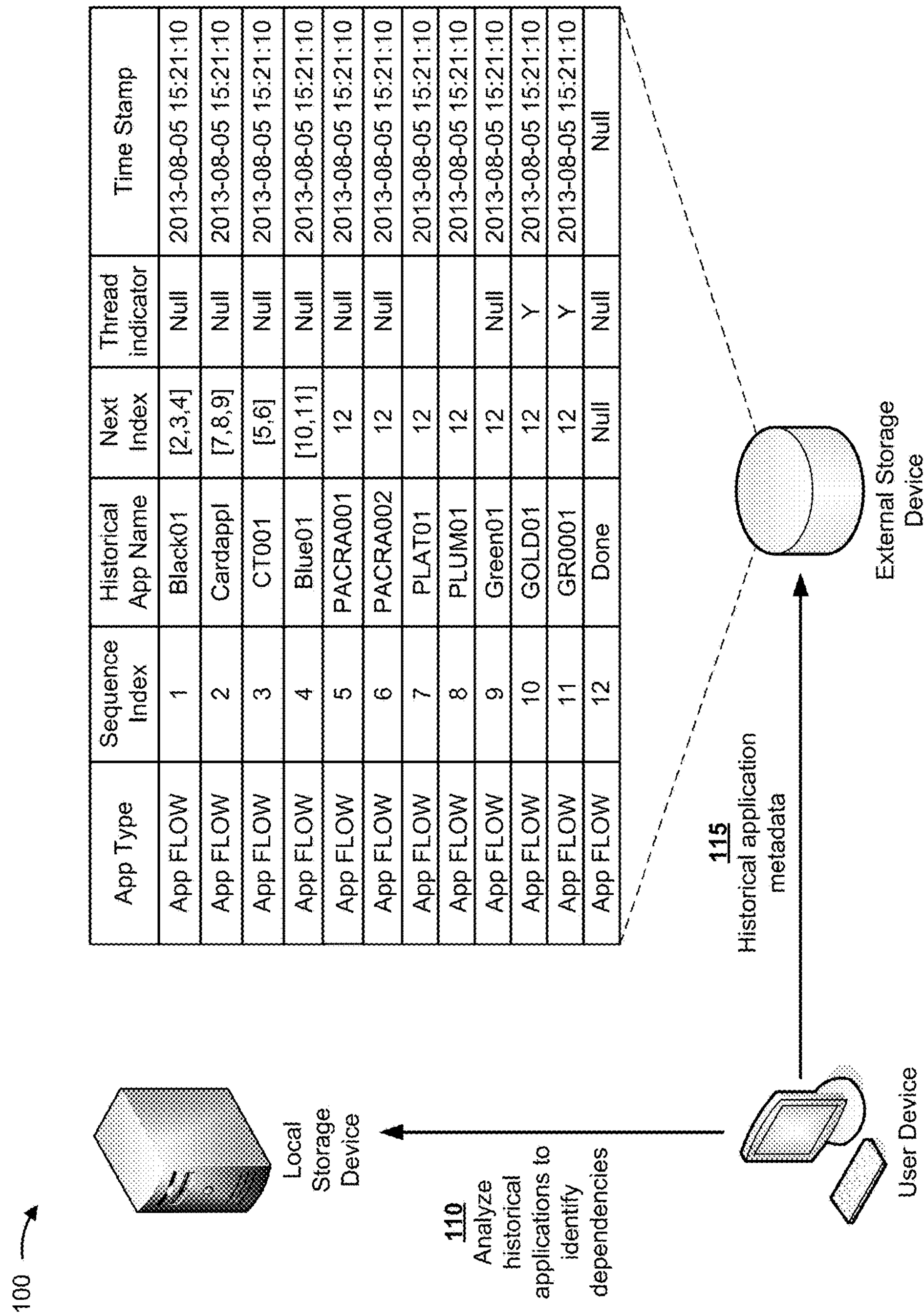

As shown in FIG. 1B, and by reference number 110, the user device may use the application design plugin to analyze a set of historical applications to identify one or more dependencies included in the set of historical applications. For example, the user device may provide credential information (e.g., a username, a password, etc.) to a local storage device, and the credential information may allow the user device to analyze source code of the set of historical applications. A dependency may be a relationship between applications and/or components of applications, such as a relationship between application names, application objects, application object connections, application design properties, application code, and/or the like.

In some implementations, the user device may analyze the set of historical applications using a regular expression. A regular expression may include a sequence of characters that defines a search pattern that may be used to analyze source code of the set of historical applications. In some implementations, the user device may analyze the set of historical applications using a lexical analyzer. A lexical analyzer may include a lexer and a parser. The lexer may convert sequences of characters included in the source code of the set of historical applications to sequences of tokens. The parser may analyze the sequence of characters and/or the sequence of tokens to identify the one or more dependencies.

As shown by reference number 115, the user device may provide, to an external storage device, historical application metadata that is associated with the one or more identified dependencies. The historical application metadata may include information indicating an application type, a sequence index, a historical application name, a next index, a thread indicator, a timestamp, and/or the like. The next index may store values indicating sequence index locations of historical applications that share dependencies. Shown as an example, Black01 has next index values of [2, 3, 4], indicating that historical applications with sequence indices of 2, 3, and 4 (e.g., CardAppl, CT001, Blue01) depend from Black01. In this way, the historical application metadata may be stored in a manner that associates historical applications and dependencies.

By identifying one or more dependencies and providing the one or more dependencies to the external storage device, the user device may access the one or more dependencies when generating an application design.

Figure 1C:
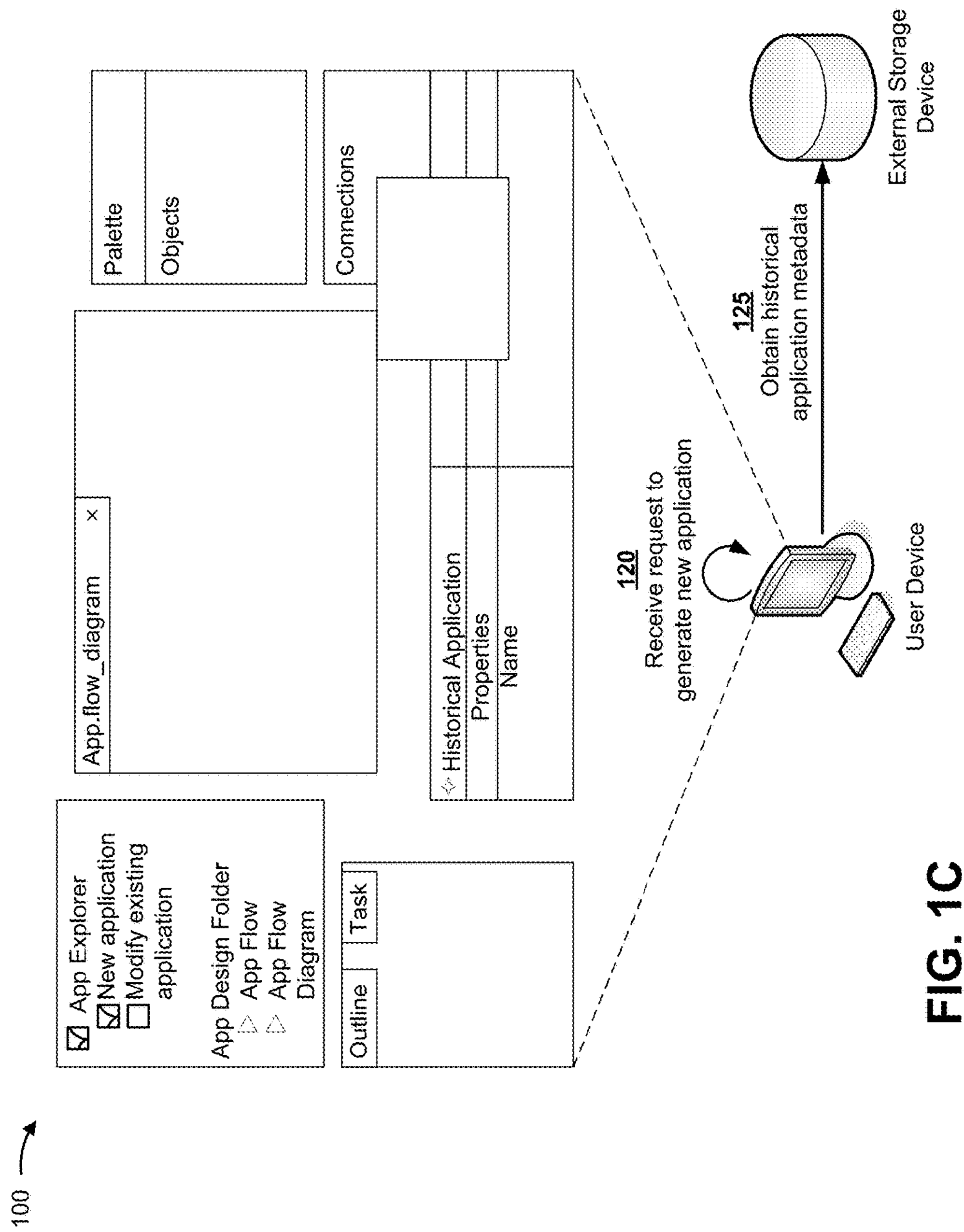

As shown in FIG. 1C, and by reference number 120, the user device may receive a request to generate a new application. For example, a user may interact with a user interface of the IDE to request to generate a new application (shown as a check mark in the application explorer window). Additionally, or alternatively, a user may interact with the user interface of the IDE to request to modify a historical application. As shown by reference number 125, the user device may obtain historical application metadata from the external storage device. In this way, the user device may obtain historical application metadata that may be used to generate design information for the IDE.

Figure 1D:
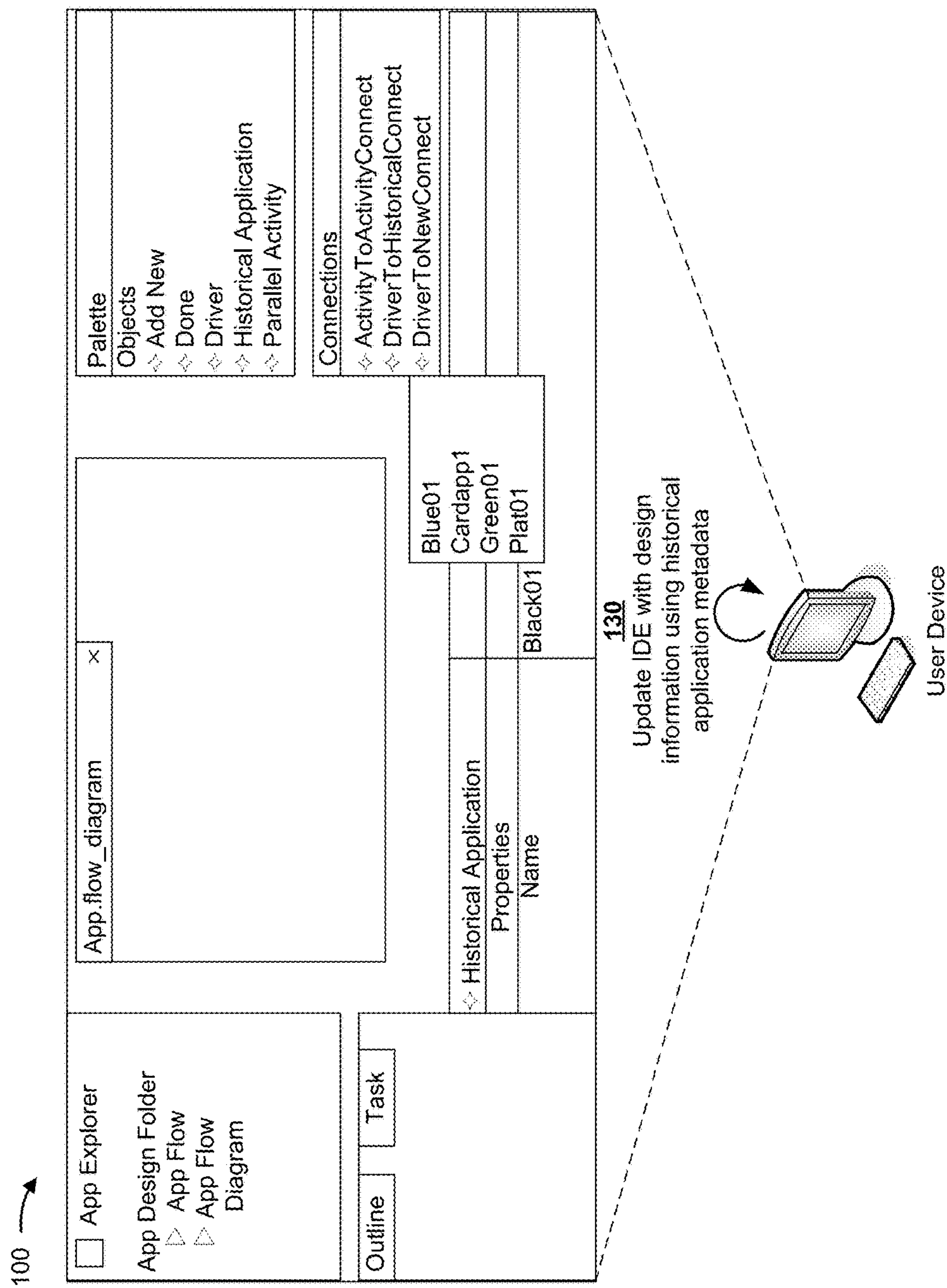

As shown in FIG. 1D, and by reference number 130, the user device may update the IDE with design information using the historical application metadata. For example, the user device may use the historical application metadata as design information and/or may use the historical application metadata to generate design information. The design information may include a set of design features, such as information indicating one or more objects (e.g., a particular function or feature of an application), one or more object connections (e.g., a relationship between objects), one or more design properties (e.g., an application type), one or more application names, and/or the like.

As an example, the historical application metadata may include a list of application names, and the user device may provide the application names for display within the application names list window of the IDE (shown as "Blue01," "Cardappl," "Green01," "Plat01," etc.). As another example, the user device may provide objects for display within the objects palette window of the IDE. In this case, if a user selects "add new," then the object palette window may display a list of objects. The objects may include metadata such as the next index values, thereby allowing the IDE to provide the objects for display while also accounting for the one or more dependencies between the objects.

Figure 1E:
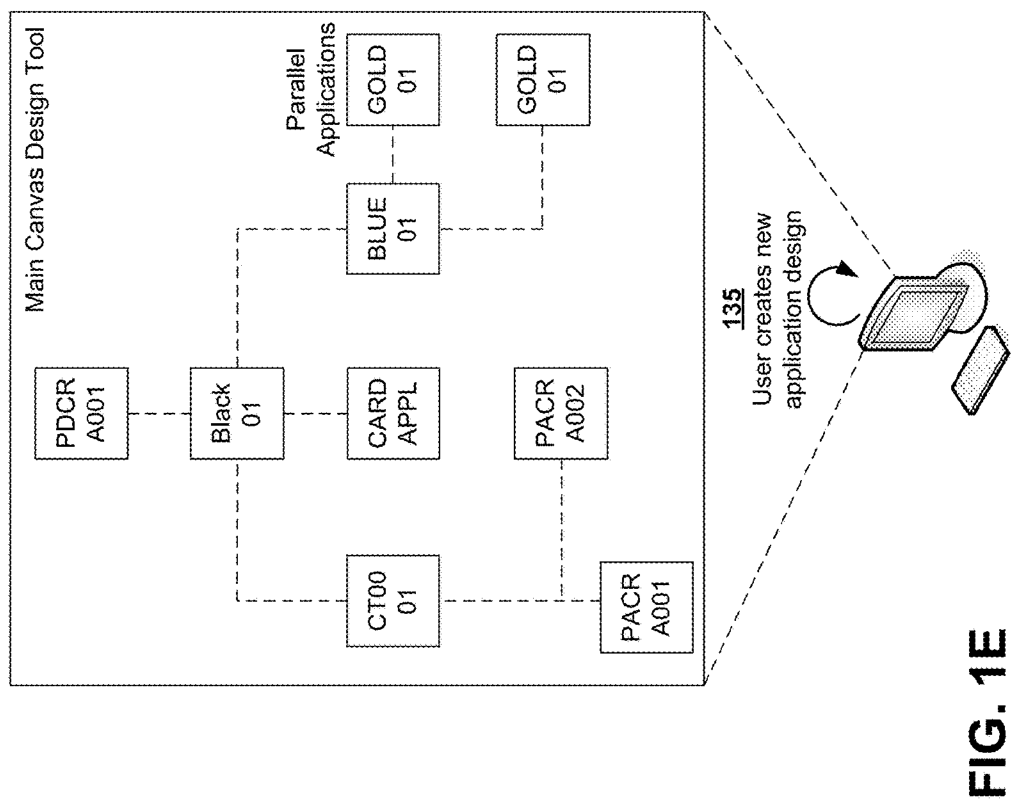

As shown in FIG. 1E, and by reference number 135, the user may create a new application design. For example, the user may create a new application design by dragging objects and object connections into a main canvas design window. In this way, the user is able to use the design information to create the new application design.

Figure 1F:
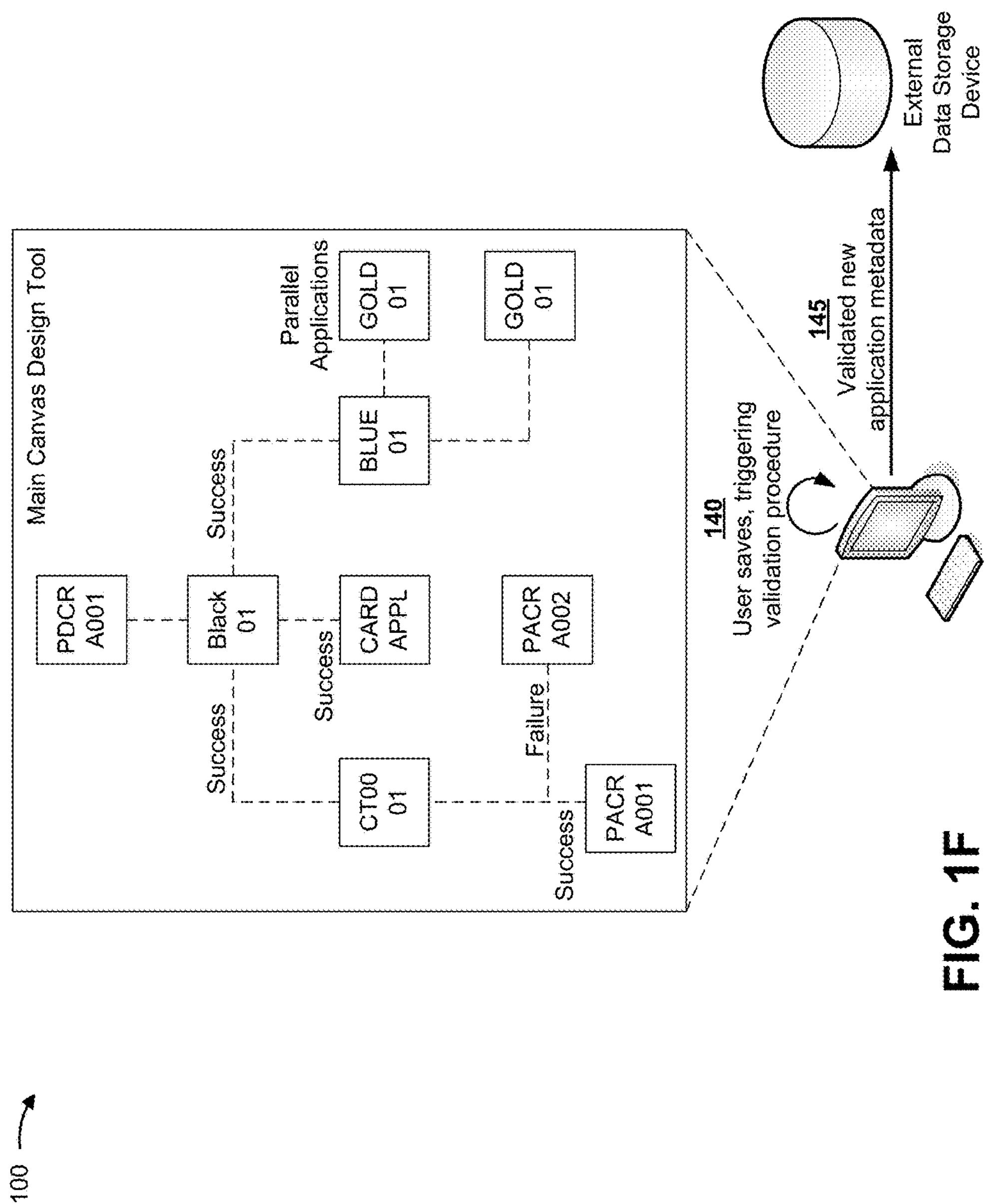

As shown in FIG. 1F, and by reference number 140, a user may interact with the user interface of the IDE to save the new application design, causing the user device to execute a validation procedure. Additionally, or alternatively, the user may specifically request that a validation procedure be executed. In some cases, the user device may execute a validation procedure that compares the set of design features (e.g., objects, object connections, etc.) of the application design and historical application metadata indicating the one or more dependencies (e.g., as indicated in the next index values). In this case, the user device may determine whether one or more design features of the set of design features match with the one or more dependencies indicated by the historical application metadata. If a match is found, the user device may display a success indicator on the user interface of the IDE. If a match is not found, the user device may display a failure indicator on the user interface of the IDE.

As shown, the user device may determine that the validation procedure succeeds for all objects and object connections except for an object connection that connects to object PACRA002. In this case, the user may replace the object connection with a different object connection and save, causing the user device to re-execute the validation procedure.

As shown by reference number 145, the user device may provide validated new application metadata to the external storage device. In this way, dependencies included in the new application design may be used during subsequent application designs.

In this way, the user device may conserve processing resources that might otherwise be used to correct errors in dependencies that are caused by modifying applications. Additionally, the user device may conserve business resources (e.g., by saving software developer time) by allowing the software developer to re-use objects and dependencies of historical applications, rather than having to re-create the objects and dependencies.

The description, herein, describes the user device as performing certain operations. In some implementations, one or more or all of these operations may be performed by a server of a cloud platform or a data center and accessed by the user device. For example, the user device may request one or more dependencies by querying the server, and the server may identify the one or more dependencies included in the set of historical applications, as described herein. In this way, the server reduces utilization of computing resources of the user device.

As indicated above, FIGS. 1A-1F are provided merely as an example. Other examples are possible and may differ from what was described with regard to FIGS. 1A-1F.

Figure 2:
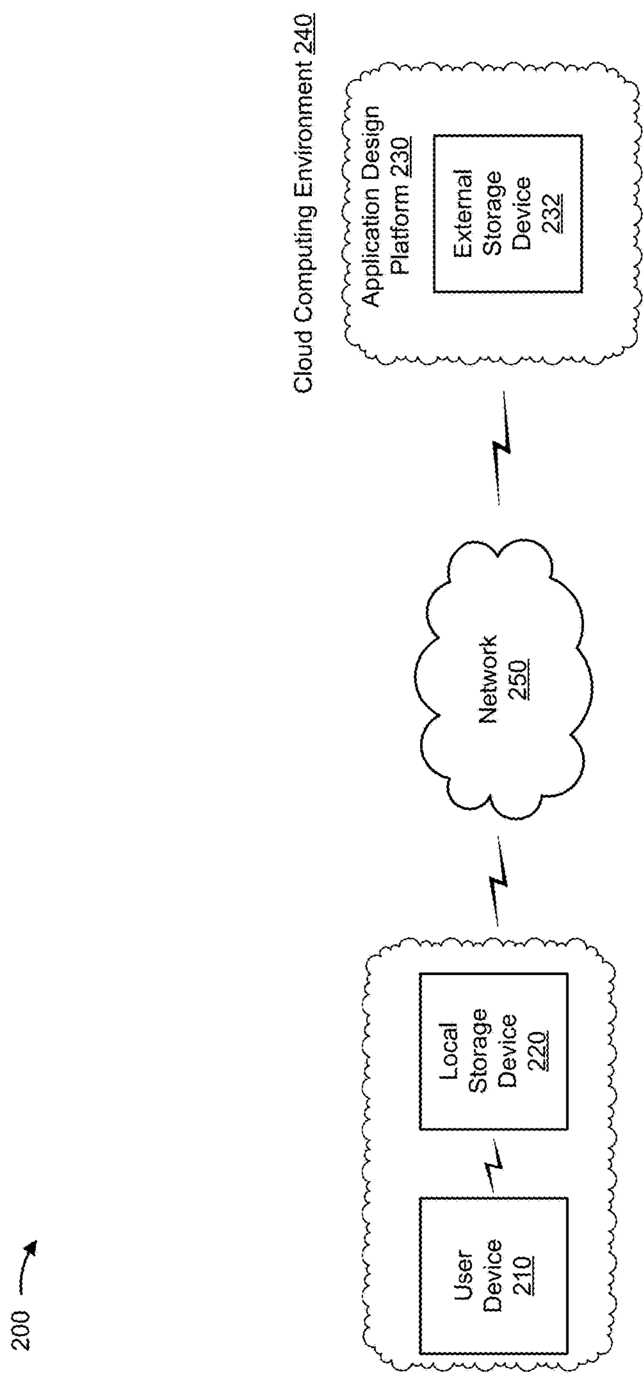
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, local storage device 220, application design platform 230 hosted within cloud computing environment 240, and/or network 250. Devices of environment 200 may interconnect via wired connections, wireless connections, or a combination of wired and wireless connections.

User device 210 includes one or more devices capable of hosting an IDE that supports plugins. For example, user device 210 may include a server, a desktop computer, a laptop computer, a wireless communication device (e.g., a smart phone), a tablet computer, a wearable computer (e.g., a smart watch, a smart band, etc.), and/or the like. In some implementations, user device 210 may include an IDE with a plugin that provides a software developer with a tool for creating and/or modifying application designs.

Local storage device 220 includes one or more devices capable of receiving, storing, and/or providing information associated with a set of historical applications. For example, local storage device 220 may include a server device, a desktop computer, a laptop computer, or a similar type of device. In some implementations, local storage device 220 may store information associated with a set of historical applications (e.g., application source code, application metadata, etc.). In some implementations, local storage device 220 may be part of user device 210. Alternatively, local storage device 220 may be a device accessible by user device 210, such as a device on a same network as user device 210. In some implementations, local storage device 220 may receive credential information from user device 210, and may provide user device 210 with access to a set of historical applications.

Application design platform 230 includes one or more devices capable of receiving, storing, processing, and/or providing information associated with applications. For example, application design platform 230 may include a server device (e.g., a host server, a web server, an application server, a data center server, a server of a cloud computing environment, etc.) or a similar device. In some implementations, application design platform 230 may perform some (or all) of the processing described in association with FIG. 4. For example, application design platform 230 may receive, from user device 210, a request to identify one or more dependencies included in the set of historical applications. In this case, application design platform 230 may perform the processing needed to identify the one or more dependencies. Additionally, or alternatively, application design platform 230 may update the IDE with design information that includes metadata identifying the one or more dependencies.

In some implementations, as shown, application design platform 230 may be hosted in cloud computing environment 240. Notably, while implementations described herein describe application design platform 230 as being hosted in cloud computing environment 240, in some implementations application design platform 230 might not be cloud-based (i.e., may be implemented outside of a cloud computing environment) or may be partially cloud-based.

Cloud computing environment 240 includes an environment that hosts application design platform 230. Cloud computing environment 240 may provide computation, software, data access, storage, and/or other services that do not require end-user knowledge of a physical location and configuration of system(s) and/or device(s) that host application design platform 230. As shown, cloud computing environment 240 may include external storage device 232.

External storage device 232 includes one or more devices capable of receiving, storing, and/or providing information associated with applications. For example, external storage device 232 may include a server device or a group of servers. In some implementations, external storage device 232 may receive and store information associated with a set of historical applications. Additionally, or alternatively, external storage device 232 may receive and store, from user device 210, information associated with a new application design and/or information associated with a modified historical application design.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
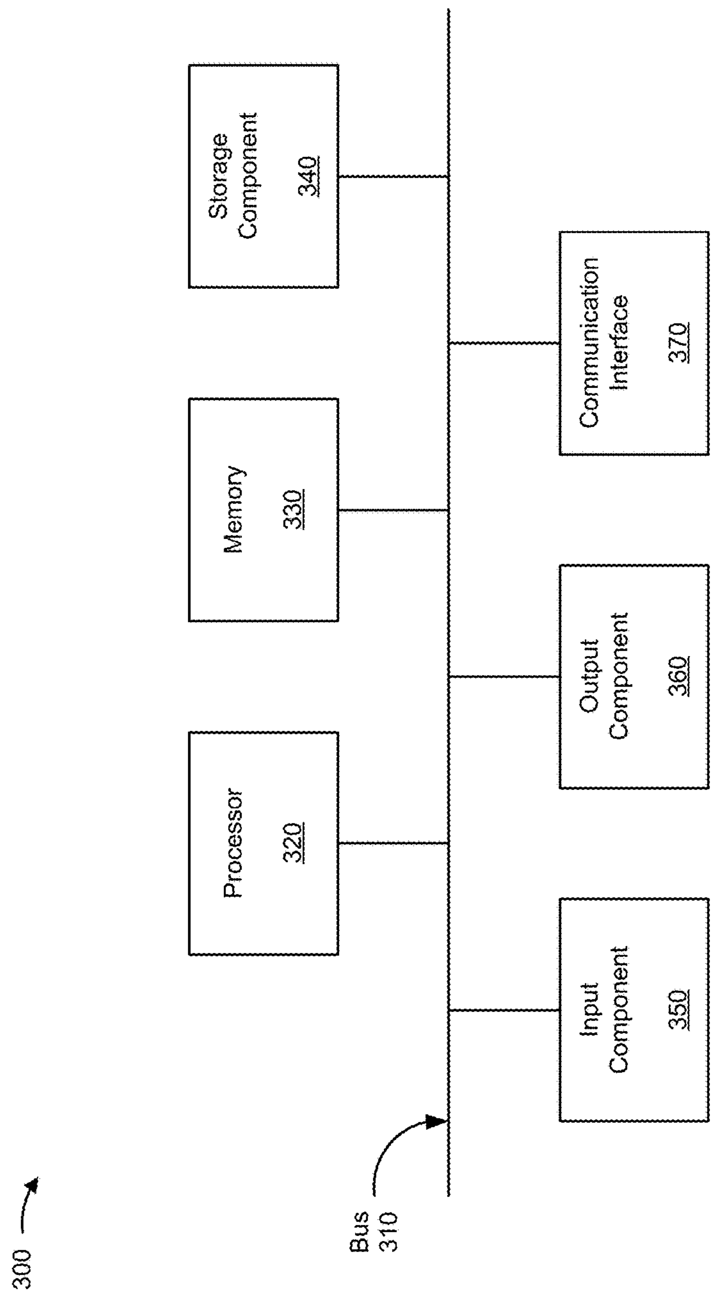
FIG. 3 is a diagram of example components of one or more devices of FIG. 2.

FIG. 3 is a diagram of example components of a device 300. Device 300 may correspond to user device 210, local storage device 220, and/or application design platform 230. In some implementations, user device 210, local storage device 220, and/or application design platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
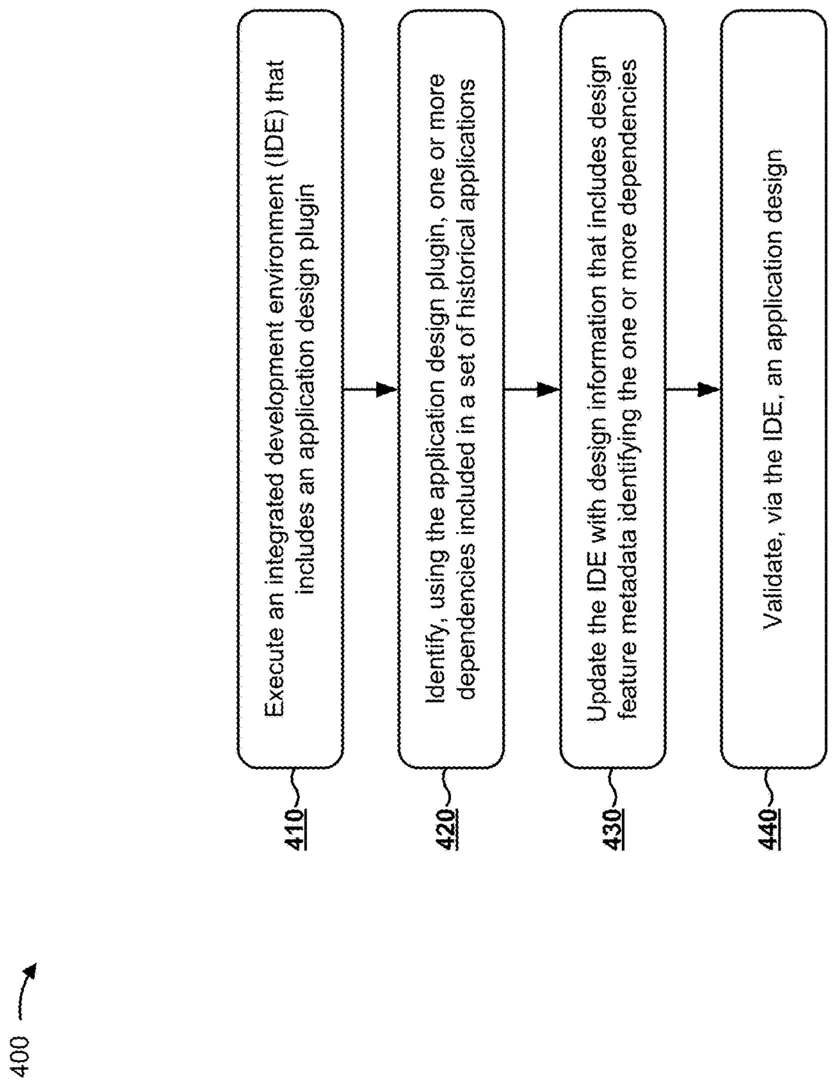
FIG. 4 is a flow chart of an example process for identifying and using dependencies in historical applications to generate and/or modify application designs.

FIG. 4 is a flow chart of an example process 400 for identifying and using dependencies in historical applications to generate and/or modify application designs. In some implementations, one or more process blocks of FIG. 4 may be performed by user device 210. In some implementations, one or more process blocks of FIG. 4 may be performed by another device or a group of devices separate from or including user device 210, such as local storage device 220 and/or application design platform 230.

As shown in FIG. 4, process 400 may include executing an integrated development environment (IDE) that includes an application design plugin (block 410). For example, user device 210 may execute an IDE that includes an application design plugin that allows a user (e.g., a software developer) to access a set of design windows that may be used to generate and/or modify application designs.

In some implementations, user device 210 may obtain an application design plugin. For example, user device 210 may obtain (e.g., install) the application design plugin via a web download, a disk install, and/or the like. In this way, user device 210 may launch an IDE with the application design plugin to access a set of design windows.

In some implementations, user device 210 may execute an IDE that includes the application design plugin. For example, user device 210 may execute an IDE that includes the application design plugin to display a set of design windows that are viewable via a user interface. The set of design windows may include an application explorer window, a main canvas design window, an objects palette window, a connections palette window, a design properties window, an application names list window, and/or the like.

In some implementations, the set of design windows may include an application explorer window that allows a user to create an application design, load a historical application design, display active application designs (e.g., via the application explorer window), and/or the like. Additionally, or alternatively, the set of design windows may include a main canvas design window for displaying an application design. For example, a software developer may access the main canvas design window to create an application design by selecting objects and object connections to identify relationships between the objects. Additionally, or alternatively, the set of design windows may include an objects palette window for displaying objects that represent applications and/or particular functions within applications. In this case, a user may access the objects palette window to add objects to the main canvas design window.

Additionally, or alternatively, the set of design windows may include a connections palette window that displays one or more object connections. For example, the connections palette window may include one or more object connections that establish relationships between objects. Additionally, or alternatively, the set of design windows may include a design properties window for displaying one or more design properties relating to an application design, such as an application name, an application description, and/or the like. Additionally, or alternatively, the set of design windows may include an application names list window for displaying a list of application names. For example, the application names list may include all application names included in the set of historical applications, application names that share at least one dependency with an application design being generated, or the like.

In this way, user device 210 may execute an IDE that allows a user to access a set of design windows for generating and/or modifying application designs.

As further shown in FIG. 4, process 400 may include identifying, using the application design plugin, one or more dependencies included in a set of historical applications (block 420). For example, user device 210 may analyze a set of historical applications to identify one or more dependencies. In some implementations, user device 210 may access, from local storage within user device 210 and/or local storage device 220, source code for the set of historical applications, and may analyze the source code to identify one or more dependencies. A dependency may be a relationship between historical applications or between components of historical applications, such as a relationship associated with application names, application objects, application object connections, application design properties, logical expressions within applications, application code, and/or the like.

In some implementations, user device 210 may analyze the set of historical applications to identify one or more dependencies. For example, user device 210 may access an application directory of local storage device 220 that includes the source code for the set of historical applications, and may analyze the source code line-by-line to identify the one or more dependencies. In some cases, a user may access a user interface of user device 210 to input credential information (e.g., a username, a password, etc.) needed to obtain access to the application directory that stores the historical application source code.

In some implementations, user device 210 may analyze the set of historical applications using a regular expression. For example, user device 210 may analyze the set of historical applications by using a regular expression to identify dependencies included in the set of historical applications. A regular expression may include a sequence of characters that defines a search pattern that may be used to analyze source code of the set of historical applications.

As an example, user device 210 may analyze the set of historical applications using the following regular expression: [ab+c][1-999]. In this case, the expression [ab+c] may allow the regular expression to match any characters included in the source code of the set of historical applications that begins with ab and ends with c (e.g., abc, abbc, abbbc, but not ac). Additionally, the numerical string "1-999" may identify dependencies with one, two, and/or three similar values. In some cases, user device 210 may analyze the set of historical applications using multiple regular expressions (e.g., [ab+c][1-999], [+][1-999], etc.).

In some implementations, user device 210 may analyze the set of historical applications using a lexical analyzer. For example, user device 210 may use a lexical analyzer that includes a lexer and a parser. The lexer may convert sequences of characters included in the source code of the set of historical applications to sequences of tokens. The parser may analyze the sequence of characters and/or the sequence of tokens to identify the one or more dependencies.

In some implementations, user device 210 may analyze a first historical application and a second historical application to identify a dependency. For example, user device 210 may compare information associated with the first historical application and information associated with the second historical application. In this case, user device 210 may determine whether the information associated with the second historical application satisfies a threshold level of similarity with the information associated with the first historical application. If the threshold level of similarity is satisfied, user device 210 may identify a dependency between the first historical application and the second historical application.

In some implementations, user device 210 may analyze the set of historical applications when the IDE is executed. In some implementations, user device 210 may analyze the set of historical applications when a user interacts with the user interface of the IDE to request an application design. In some implementations, user device 210 may analyze the set of historical applications prior to when the IDE is executed, such as when the application design plugin is installed.

In some implementations, user device 210 may provide historical application metadata associated with the one or more identified dependencies to external storage device 232. For example, user device 210 may provide historical application metadata to a data structure associated with external storage device 232. The historical application metadata may include information indicating an application name, an application type, a sequence index, a next index value, a thread indicator value, a timestamp value, and/or the like. In some cases, the index value of the historical application metadata may be used to reference a storage location of historical applications that share a dependency. By providing historical application metadata to external storage device 232, user device 210 is able to access the historical application metadata when generating an application design, as described further herein.

In this way, user device 210 may identify one or more dependencies included in the set of historical applications, and may access the one or more dependencies when generating an application design.

As further shown in FIG. 4, process 400 may include updating the IDE with design information that includes design feature metadata identifying the one or more dependencies (block 430). For example, user device 210 may receive, from a user accessing a user interface of the IDE, a request to generate an application design, which can trigger user device 210 to update the IDE with design information. In this case, user device 210 may obtain, from external storage device 232, historical application metadata that includes information identifying the one or more dependencies, and may use the historical application metadata to generate design information for the IDE. The design information may include a set of design features, such as information indicating one or more objects (e.g., a particular function or feature of an application), one or more object connections (e.g., a relationship between objects), one or more design properties (e.g., an application type), one or more application names, and/or the like. A design feature may include design feature metadata which may be used to store the historical application metadata that identifies the one or more dependencies.

In some implementations, user device 210 may receive a request to generate an application design. For example, a user may request to generate an application design by interacting with a user interface of the IDE. In this case, the request may trigger user device 210 to obtain historical application metadata needed to generate design information for the IDE.

In some implementations, user device 210 may obtain historical application metadata from external storage device 232. For example, user device 210 may query a data structure associated with external storage device 232 to obtain historical application metadata, such as historical application names, indices that identify the one or more dependencies, and/or the like. In this way, user device 210 may obtain historical application metadata that may be used to generate design information that includes the one or more dependencies between the historical applications.

In some implementations, user device 210 may use the historical application metadata to generate design information for the IDE. For example, user device 210 may, for a historical application associated with the historical application metadata, generate one or more design features. In this case, the one or more design features may include design feature metadata for storing the historical application metadata that identifies the one or more dependencies.

As an example, assume the historical application metadata includes an application name Black01, and a next index value indicating the following three sequence indices: sequence index 2, sequence index 3, and sequence index 4. Further assume that sequence index 2 is associated with an application name Cardappl, that sequence index 3 is associated with an application name CT001, and that sequence index 4 is associated with an application name Blue01. In this case, user device 210 may generate design information associated with the Black01 application, such as by generating an object named Black01. Here, the object may include design feature metadata indicating that the Black01 object has dependencies with Cardappl, CT001, and Blue01. In this way, user device 210 is able to update the IDE with design information that includes the one or more dependencies.

In some implementations, a user may interact with a user interface of the IDE and may use the design information to generate a new application design. For example, the user may access objects from the objects palette window and may place the objects into the main canvas design window (e.g., by dragging and dropping, by clicking on objects and desired locations, by using spoken commands, etc.). Additionally, the user may access object connections from the connections palette window and use the object connections to connect the objects that have been placed in the main canvas design window.

In some implementations, a user may interact with a user interface of the IDE and may use the design information to modify a historical application design. For example, user device 210 may load a historical application design for display on the user interface of the IDE, allowing a user to modify the historical application design in the same manner described above.

By allowing a user to generate and/or modify an application design using the design information, user device 210 conserves processing resources that might otherwise be used to generate an application design without use of the design information. Additionally, by using the design information to generate and/or modify an application design, user device 210 saves business resources (e.g., software developer design time).

As further shown in FIG. 4, process 400 may include validating, via the IDE, an application design (block 440). For example, user device 210 may execute a validation procedure to verify one or more dependencies associated with the application design. In some implementations, user device 210 may provide, to external storage device 232, application metadata associated with the validated application design.

In some implementations, user device 210 may receive an indication that the application design is ready for validation. For example, a validation procedure may be triggered when a user saves an application design. Additionally, or alternatively, a validation procedure may be triggered when a user expressly requests a validation.

In some implementations, user device 210 may execute a validation procedure. For example, user device 210 may execute a validation procedure by comparing the set of design features of the application design and the one or more dependencies. In this case, user device 210 may determine whether one or more design features of the set of design features satisfies a threshold level of similarity with the one or more dependencies. If the threshold level of similarity is satisfied, then the validation may succeed. If the threshold level of similarity is not satisfied, then the validation may fail.

As an example, assume user device 210 executes a validation procedure on an application design. Further assume a dependency does not exist between two parallel applications (i.e. two applications that do not share a dependency), but that a user adds a dependency between the parallel applications while creating the application design. In this case, the validation procedure may fail, alerting the user of the improper dependency.

In some implementations, user device 210 may provide, for display on a user interface of the IDE, an indication that the validation procedure succeeded or an indication that the validation procedure did not succeed. For example, the main canvas design window may display "success" when a validation succeeds and "fail" when a validation does not succeed (shown in FIG. 1F).

In some implementations, if a validation fails, user device 210 may automatically recommend design information. For example, if a validation fails, user device 210 may analyze the design feature metadata to identify one or more dependencies that may be used in the application design. In this case, user device 210 may generate a recommendation (e.g., a popup) that indicates to a user the one or more proper dependencies.

As an example, assume a user generates an application design that has a first application depend from a second application. Further assume that the validation fails because the first application depends from a third application and not the second application. In this case, a notification (e.g., a popup) may indicate to a user that the proper dependency is the first application depending from the third application, thereby allowing the user to adjust the objects in the main canvas design window. As another example, in addition to or as an alternative to indicating the proper dependency, user device 210 may automatically correct the dependency via a single input by the user (e.g., by a single input corresponding to an authorization, by a single input corresponding to a validation, or the like). In this way, user device 210 conserves processing resources that might otherwise be used to correct application design errors.

In some implementations, user device 210 may automatically add design information to the user interface of the IDE. For example, user device 210 may automatically add design information if a proper dependency exists. In this case, if a user interacts with the user interface to cause the user interface to display a first object, user device 210 may analyze the design information metadata to determine the one or more dependencies associated with the first object. If user device 210 determines that a dependency exists, then user device 210 may automatically add the dependency to the user interface of the IDE (e.g., without any additional user interaction).

In some implementations, user device 210 may provide design feature metadata to external storage device 232. For example, if a validation succeeds, user device 210 may provide design feature metadata associated with the application design to external storage device 232. In this way, dependencies included in the application design may be used during subsequent application designs.

In this way, user device 210 may validate the application design, thereby conserving processing resources that might otherwise be used when a software developer would need to revise and re-create an application design that includes dependency errors.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the user device conserves processing resources that might otherwise be used to correct errors in dependencies that are caused by modifying applications. Additionally, by allowing the software developer to re-use objects and dependencies of historical applications, user device 210 reduces utilization of computing resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:

one or more processors to:

analyze a set of historical applications to identify one or more dependencies included in the set of historical applications, the one or more dependencies identifying relationships between historical applications, and when analyzing the set of historical applications, the one or more processors are to:
compare information associated with a first historical application of the set of historical applications and information associated with a second historical application of the set of historical applications,
determine that the information associated with the second historical application satisfies a threshold level of similarity with the information associated with the first historical application, and
identify a dependency of the one or more dependencies based on determining that the threshold level of similarity is satisfied;
provide, to a storage device, historical application metadata relating to the one or more dependencies;
receive, via a user interface, a request to generate an application design;
update the user interface with design information that includes a set of design features for generating the application design,
the set of design features including design feature metadata identifying the one or more dependencies;
receive an indication that the application design is ready for validation; and
validate the application design based on receiving the indication that the application design is ready for validation.

2. The device of claim 1, where the one or more dependencies include at least one of:
a relationship associated with application names,
a relationship associated with application objects,
a relationship associated with application object connections,
a relationship associated with application design properties, or
a relationship associated with code within the set of historical applications.

3. The device of claim 1, where the one or more processors, when analyzing the set of historical applications, are to:
analyze the set of historical applications using a regular expression,
the regular expression including a search pattern that causes the device to analyze source code of the set of historical applications to identify the one or more dependencies.

4. The device of claim 1, where the one or more processors, when analyzing the set of historical applications, are to:
analyze the set of historical applications using a lexical analyzer,
the lexical analyzer to:
convert sequences of characters included in source code of the set of historical applications to sequences of tokens, and
analyze the sequences of characters and the sequences of tokens to identify the one or more dependencies.

5. The device of claim 1, where the one or more processors, when updating the user interface with the design information, are to:
obtain the design information from a data structure associated with the storage device, and
update the user interface with the design information to cause the set of design features to be displayed on the user interface.

6. The device of claim 1, where the one or more processors, when validating the application design, are to:
execute a validation procedure by comparing the set of design features of the application design and the one or more dependencies,
validate the set of design features based on executing the validation procedure, and
provide design feature metadata associated with the set of design features to the storage device.

7. The device of claim 1, where the one or more processors, when validating the application design, are to:
execute a validation procedure by comparing the set of design features of the application design and the one or more dependencies,
determine that one or more design features of the set of design features failed the validation procedure, and
provide, for display on a user interface, an indication that the validation procedure did not succeed.

8. A method, comprising:
analyzing, by a device, a set of historical applications to identify one or more dependencies included in the set of historical applications,
the one or more dependencies identifying relationships between historical applications;
providing, by the device and to a storage device, historical application metadata relating to the one or more dependencies;
receiving, by the device and via a user interface, a request to generate a new application design or to modify a historical application design;
updating, by the device, the user interface with design information that includes a set of design features for generating the new application design or modifying the historical application design,
the set of design features including design feature metadata identifying the one or more dependencies;
receiving, by the device, an indication that the new application design or the modified historical application design is ready for validation; and
validating, by the device, the new application design or the modified historical application design based on receiving the indication,
validating the new application design comprising:
comparing one or more objects and one or more object connections included in the design information and the one or more dependencies,
determining that the one or more objects and the one or more object connections satisfy a threshold level of similarity with the one or more dependencies, and
validating the one or more objects and the one or more object connections based on determining that the threshold level of similarity is satisfied.

9. The method of claim 8, where the historical application metadata includes at least one of:
information indicating an application name,
information indicating an application type,
information indicating a sequence index, or
information indicating a next index.

10. The method of claim 8, where the user interface includes a set of design windows, the set of design windows including at least one of:
a first window that creates and/or loads an application design,
a second window that displays the application design,
a third window that displays objects,
a fourth window that displays object connections, a fifth window that displays design properties, or a sixth window that displays application names.

11. The method of claim 8, where analyzing the set of historical applications comprises:

comparing information associated with a first historical application of the set of historical applications and information associated with a second historical application of the set of historical applications, determining that the information associated with the second historical application satisfies a threshold level of similarity with the information associated with the first historical application, and identifying a dependency of the one or more dependencies based on determining that the threshold level of similarity is satisfied.

12. The method of claim 8, where analyzing the set of historical applications comprises:

providing credential information to obtain access to a local storage device that stores the set of historical applications, and analyzing the set of historical applications using a regular expression, the regular expression including a search pattern that causes the device to analyze the set of historical applications to identify the one or more dependencies.

13. The method of claim 8, where validating the new application design or the modified historical application design comprises:

comparing the set of design features of the new application design or the historical application design and the one or more dependencies, determining that one or more design features of the set of design features failed a validation procedure based on comparing the set of design features and the one or more dependencies, and providing, for display on a user interface, an indication that the validation procedure did not succeed.

14. The method of claim 13, further comprising:

analyzing the design feature metadata to identify a dependency of the one or more dependencies, and providing, to a user interface, a recommendation identifying the dependency as a proper dependency to use in the new application design or the historical application design, the proper dependency being a dependency that would pass the validation procedure.

15. A non-transitory computer-readable medium storing instructions, the instructions comprising:

one or more instructions that, when executed by one or more processors, cause the one or more processors to:

analyze a set of historical applications to identify one or more dependencies included in the set of historical applications;

provide, to a storage device, historical application metadata relating to the one or more dependencies;

receive, via a user interface, a request to generate an application design;

update the user interface with design information, the design information including design feature metadata identifying the one or more dependencies;

determine that the application design is ready for validation; and validate the application design based on determining that the application design is ready for validation, the one or more instructions to validate the application design causing the one or more processors to:

execute a validation procedure by comparing one or more objects and one or more object connections included in the design information and the one or more dependencies, determine that a connection of the one or more object connections does not satisfy a threshold level of similarity with the one or more dependencies, and provide, for display on the user interface, an indication that the validation procedure did not succeed.

16. The non-transitory computer-readable medium of claim 15, where the design information includes at least one of:

information indicating one or more objects, information indicating one or more object connections, information indicating one or more design properties, or information indicating one or more application names.

17. The non-transitory computer-readable medium of claim 15, where the one or more instructions, that cause the one or more processors to analyze the set of historical applications, cause the one or more processors to:

analyze the set of historical applications using a regular expression, the regular expression including a search pattern that causes a device to analyze the set of historical applications to identify the one or more dependencies.

18. The non-transitory computer-readable medium of claim 17, where the one or more instructions, that cause the one or more processors to use the regular expression to analyze the set of historical applications, cause the one or more processors to:

compare information associated with a first historical application of the set of historical applications and information associated with a second historical application of the set of historical applications, determine that the information associated with the second historical application satisfies a threshold level of similarity with the information associated with the first historical application, and identify a dependency of the one or more dependencies based on determining that the threshold level of similarity is satisfied.

19. The non-transitory computer-readable medium of claim 15, where the one or more instructions, that cause the one or more processors to validate the application design, cause the one or more processors to:

compare one or more objects and one or more object connections included in the design information and the one or more dependencies, determine that the one or more objects and the one or more object connections satisfies a threshold level of similarity with the one or more dependencies, and validate the one or more objects and the one or more object connections based on determining that the threshold level of similarity is satisfied.

20. The non-transitory computer-readable medium of claim 15, where the one or more instructions, when validating the application design based on determining that the application design is ready for validation, cause the one or more processors to:

determine that a different connection of the one or more object connections satisfies the threshold level of similarity with the one or more dependencies; and provide, for display on the user interface, a different indication indicating that a different validation procedure succeeded.

* * * * *